United States Patent
O'Riordan et al.

(10) Patent No.: US 11,455,106 B1
(45) Date of Patent: Sep. 27, 2022

(54) IDENTIFYING AND RECOVERING UNUSED STORAGE RESOURCES ON A STORAGE SYSTEM

(71) Applicant: EMC IP HOLDING COMPANY LLC, Hopkinton, MA (US)

(72) Inventors: Finbarr O'Riordan, Ballinlough (IE); Tim O'Connor, Knocknagoul (IE); Warren Fleury, Ballincollig (IE)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/355,324

(22) Filed: Jun. 23, 2021

(51) Int. Cl.
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0619* (2013.01); *G06F 3/0653* (2013.01); *G06F 3/0659* (2013.01)

(58) Field of Classification Search
None
See application file for complete search history.

(56) References Cited

U.S. PATENT DOCUMENTS

| | | | | |
|---|---|---|---|---|
| 8,788,778 | B1* | 7/2014 | Boyle | G06F 12/0246 711/155 |
| 2015/0347252 | A1* | 12/2015 | Andre | G06F 11/008 714/6.3 |
| 2016/0011944 | A1* | 1/2016 | Jain | G06F 16/27 707/674 |
| 2016/0350171 | A1* | 12/2016 | Resch | G06F 3/0619 |

* cited by examiner

*Primary Examiner* — Yaima Rigol
*Assistant Examiner* — Alexander J Yoon
(74) *Attorney, Agent, or Firm* — Anderson Gorecki LLP

(57) ABSTRACT

A storage reclamation orchestrator is implemented to identify and recover unused storage resources on a storage system. The storage reclamation orchestrator analyses storage usage attributes of storage groups occupying storage resources of the storage system. The storage reclamation orchestrator assigns individual usage point values to each storage usage attribute of a given storage group. The individual usage point values are combined to assign a final usage point value to the storage group. Storage groups with usage point values above a threshold are candidate storage groups for recovery on the storage system. Example storage usage attributes include whether the storage group has been masked to a host device, an amount of time since IO activity has occurred on the storage group, an amount of time since local protection was implemented on the storage group, and an amount of time since remote protection was implemented on the storage group.

20 Claims, 11 Drawing Sheets

FIG. 3

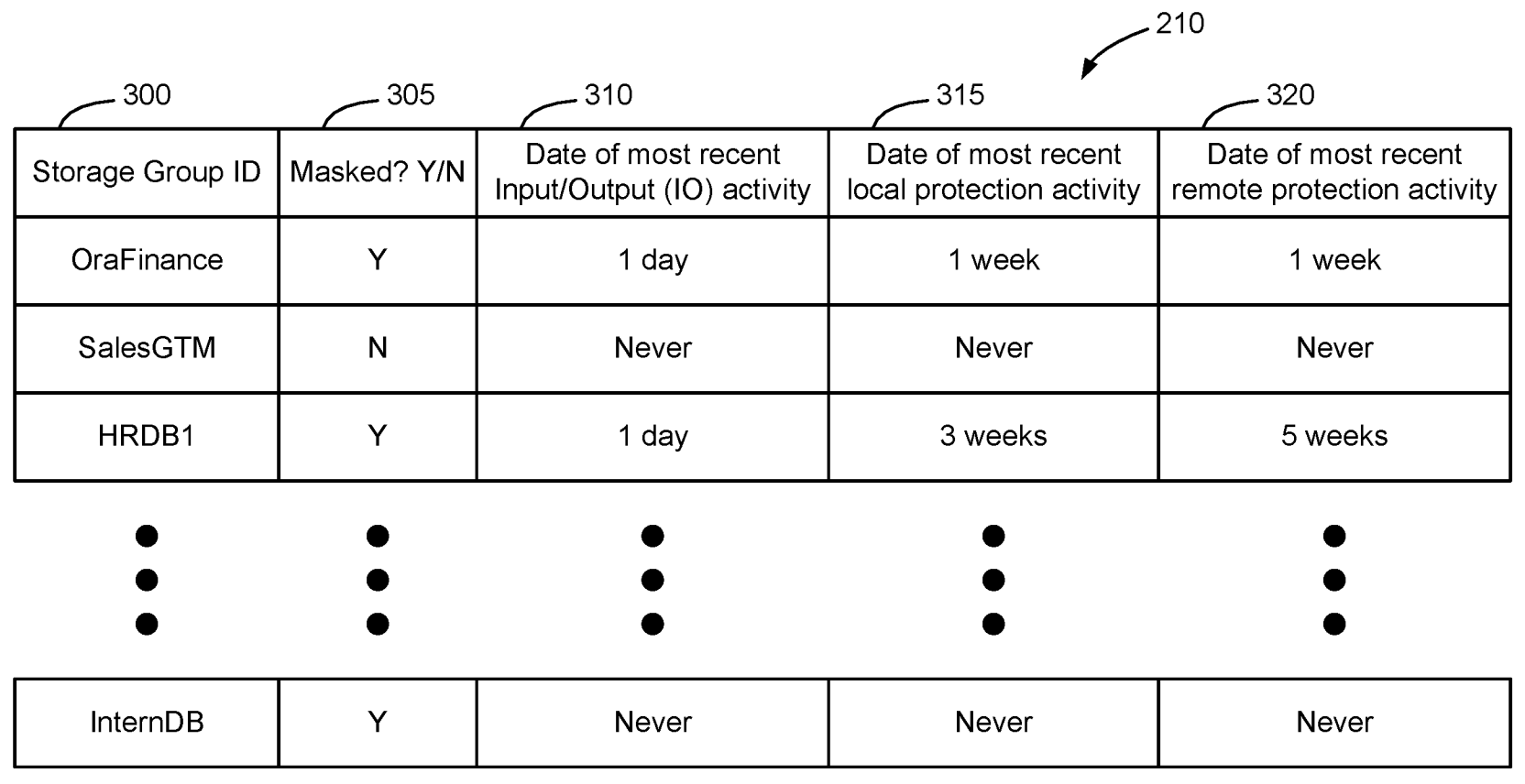

| Storage Group ID | Masked? Y/N | Date of most recent Input/Output (IO) activity | Date of most recent local protection activity | Date of most recent remote protection activity |
|---|---|---|---|---|
| OraFinance | Y | 1 day | 1 week | 1 week |
| SalesGTM | N | Never | Never | Never |
| HRDB1 | Y | 1 day | 3 weeks | 5 weeks |
| ••• | ••• | ••• | ••• | ••• |
| InternDB | Y | Never | Never | Never |

FIG. 11

| Storage Group ID | Masked: $RS_1$ | IO Activity: $RS_2$ | Local Protection: $RS_3$ | Remote Protection: $RS_3$ | Total: $RS_F$ | Candidate for Recovery? | Amount of recoverable storage |
|---|---|---|---|---|---|---|---|
| OraFinance | 0 | 0 | 0 | 0 | 0 | No | N/A |
| SalesGTM | 10 | 10 | 10 | 10 | 40 | Yes | 3.5 TB |
| HRDB1 | 0 | 0 | 4 | 6 | 10 | No | N/A |
| ••• | ••• | ••• | ••• | ••• | ••• | ••• | ••• |
| InternDB | 0 | 10 | 10 | 10 | 30 | Yes | 2.5 TB | ns of any type, such as hard disk drives and solid-state drives.

IDENTIFYING AND RECOVERING UNUSED STORAGE RESOURCES ON A STORAGE SYSTEM

FIELD

This disclosure relates to computing systems and related devices and methods, and, more particularly, to identifying and recovering unused storage resources on a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage reclamation orchestrator is implemented to identify and recover unused storage resources on a storage system. The storage reclamation orchestrator analyses storage usage attributes of storage groups occupying storage resources of the storage system. The storage reclamation orchestrator assigns individual usage point values to each storage usage attribute of a given storage group. The individual usage point values are combined to assign a final usage point value to the storage group. Storage groups with usage point values above a threshold are candidate storage groups for recovery on the storage system. Example storage usage attributes include whether the storage group has been masked to a host device, an amount of time since IO activity has occurred on the storage group, an amount of time since local protection was implemented on the storage group, and an amount of time since remote protection was implemented on the storage group. Other storage usage attributes may be considered as well, and this list of storage usage attributes is merely one example group of storage usage attributes.

BRIEF DESCRIPTION OF THE DRAWINGS

FIG. 3 is an example storage usage data structure containing storage group usage attributes for use by the storage reclamation orchestrator, according to some embodiments.

FIG. 11 is a functional block diagram of an example report generated by a storage reclamation orchestrator, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
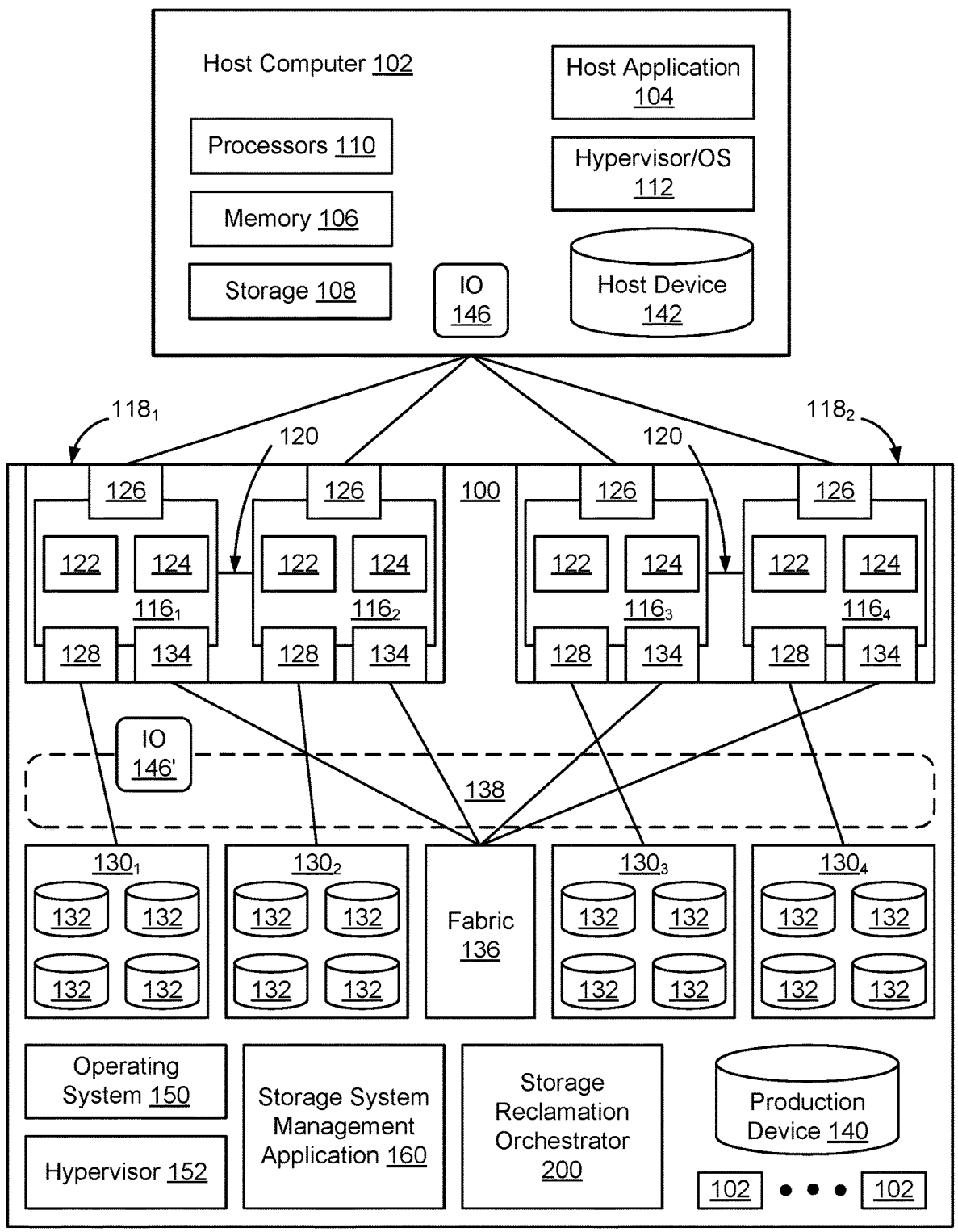
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104. Production device 140 is implemented using a collection of storage resources referred to herein as a storage group.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100. When a host device 142 is to be used by a host application 104, it is masked to a production device that is mapped to a storage group.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e. g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the snapshot copy.

Applications are allocated storage capacity on the storage resources 130 of storage system 100. Sometimes storage capacity is over-allocated to an application, for example where a person requests that 2 terabytes (TB) of storage capacity be allocated to a particular application, whereas in reality the application only needs access to 1 TB of storage capacity. Other storage allocations are either never used, or are used for a period of time and then stop being used. For example, a given storage allocation may be required initially, but then the project associated with the storage allocation may be cancelled such that the storage allocation is no longer required. Similarly, a person who requested the storage allocation may leave the department or company, or the host application that was storing data in the storage allocation may otherwise no longer be used, such that the storage allocation is no longer needed on the storage system.

In these and many other situations, it would be advantageous to have a way to identify and recover unused storage resources on a storage system. According to some embodiments, a storage reclamation orchestrator 200 is implemented to identify and recover unused storage resources on a storage system. The storage reclamation orchestrator 200 analyses storage usage attributes of storage groups occupying storage resources of the storage system. The storage reclamation orchestrator 200 assigns individual usage point values to each storage usage attribute of a given storage group. The individual usage point values are combined to assign a final usage point value to the storage group. Storage groups with usage point values above a threshold are candidate storage groups for recovery on the storage system. Example storage usage attributes include whether the storage group has been masked to a host device, an amount of time since IO activity has occurred on the storage group, an amount of time since local protection was implemented on the storage group, and an amount of time since remote protection was implemented on the storage group. Other storage usage attributes may be considered as well, and this list of storage usage attributes is merely one example group of storage usage attributes.

Figure 2:
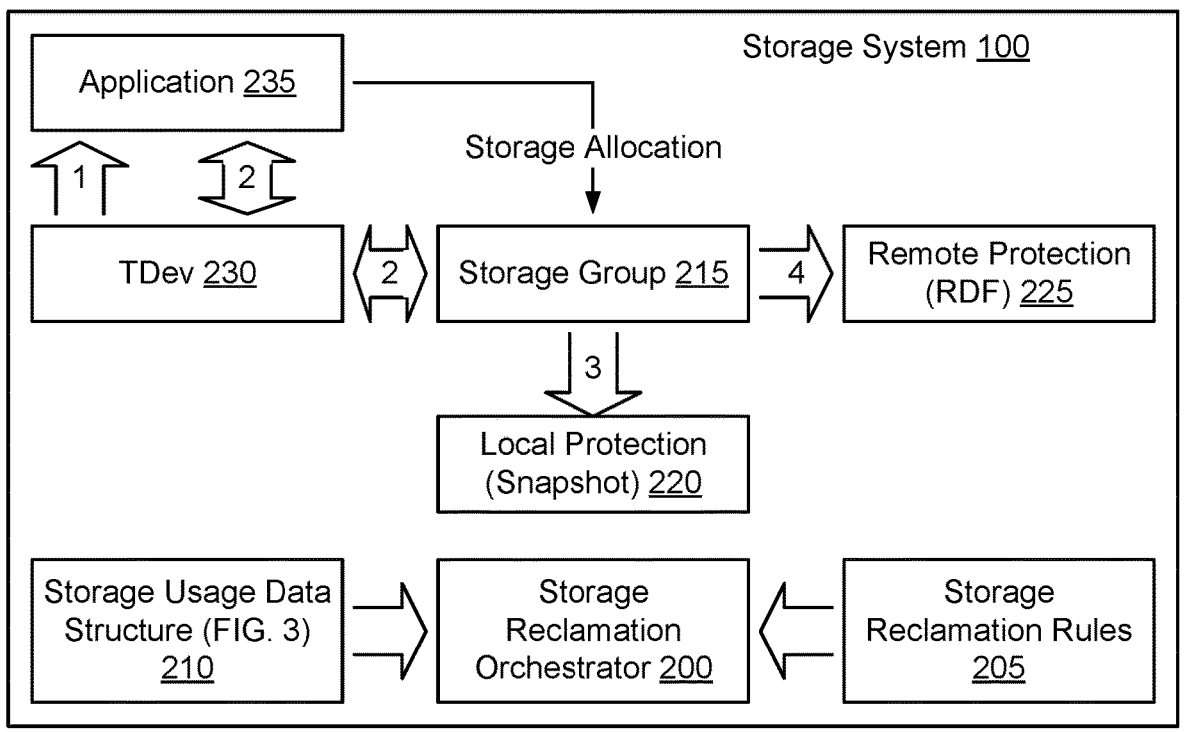
FIG. 2 is a functional block diagram of an example storage system including a storage reclamation orchestrator configured to identify and recover unused storage resources, according to some embodiments.

FIG. 2 is a functional block diagram of an example storage system 100 including a storage reclamation orchestrator 200 configured to identify and recover unused storage resources, according to some embodiments. As shown in FIG. 2, a set of storage resources 132 from a storage group 215 is allocated to an application 235. Storage group 215, in some embodiments, is allocated from a group of physical storage resources configured to provide a particular quality of service to the application 235. Multiple storage volumes may be created using storage resources of storage group 215. For purposes of this disclosure, the term "storage group" is used to refer to a logical group of physical storage resources allocated to be used by a particular application 235 or set of applications 235. A storage group is "mapped" on the storage system when it is created for use by the application 235 or set of applications 235.

To access the storage resources of the storage group 215, a thin device 230 is masked to the storage group 215 (FIG. 2 arrow 1). The thin device 230 is used by the application to issue Input/Output (IO) operations on the storage resources of storage group 215 (FIG. 2, arrows 2). If a storage group 215 is not masked, the application cannot issue IO operations on the storage resources implementing the storage group 215.

Data contained in the storage group 215 may be protected using local data protection (FIG. 2, arrow 3) such as by having snapshots 220 of the storage group 215 created periodically. A snapshot, as that term is used herein, is a copy of the data of the storage group as that data existed at a particular point in time. A snapshot may be a full copy of the data contained in the storage group or may contain only the changes to the data that have occurred since creation of a previous snapshot copy.

The data contained in the storage group 215 may also be protected remotely, for example by having the data contained in the storage group 215 mirrored to another storage system on a remote data forwarding session 225. By mirroring the data to a remote storage system, it is possible for the application to recover from a partial or total loss of the data of the storage group 215.

As shown in FIG. 2, in some embodiments the storage reclamation orchestrator 200 accesses storage usage data from a storage usage data structure 210. The storage usage data structure 210 may contain storage group usage attributes for storage groups 215 on the storage system 100, which enable the storage reclamation orchestrator 200 to infer whether the storage group is currently being used and, if not currently being used, whether the storage group has been used recently. The storage reclamation orchestrator 200 applies a set of storage reclamation rules 205 to assign recovery score values to the storage groups 215 mapped on the storage system 100. Based on the assigned recovery score values, the storage reclamation orchestrator 200 identifies storage groups that are candidates for recovery, which may be implemented by a storage administrator or may be implemented automatically depending on the embodiment. By identifying storage groups that are candidates for recovery, the storage reclamation orchestrator 200 enables the storage resources 132 of the storage system 100 to be allocated more efficiently, by ensuring that storage resources 132 are not allocated to applications that no longer require them.

FIG. 3 is an example storage usage data structure 210 containing storage group usage attributes for use by the storage reclamation orchestrator 200, according to some embodiments. As shown in FIG. 3, in some embodiments the storage usage data structure 210 contains an entry for each storage group 215. In some embodiments, each entry includes a storage group identifier 300. The entries also include storage group usage attributes 305, 310, 315, and 320 of the storage group.

In some embodiments, one of the storage group usage attributes 305 that may be used to identify candidate storage groups for recovery is whether the storage group is mapped but not currently masked. If a storage group is not currently masked, or has never been masked, the storage group currently is not being used by any application, which might indicate that the storage group is a candidate for recovery.

Another storage group usage attribute 310 may indicate the date of most recent Input/Output (IO) activity on the storage group. If there has been no IO activity on a particular storage group for an extended period of time, the storage group may be a possible candidate for recovery.

Another storage group usage attribute 315 may indicate the date of the most recent local protection activity on the storage group. If there has been no local protection activity on a particular storage group for an extended period of time, the storage group may be a possible candidate for recovery.

Another storage group usage attribute 320 may indicate the date of the most recent remote protection activity on the storage group. If there has been no remote protection activity on a particular storage group for an extended period of time, the storage group may be a possible candidate for recovery.

Storage usage data structure may also include information about the size of the storage group, number of snapshots, the size of the snapshots, and other information associated with the amount of storage used by the storage group, to enable the storage reclamation orchestrator 200 to determine how much storage will be reclaimed if a storage group is recovered.

Figure 4:
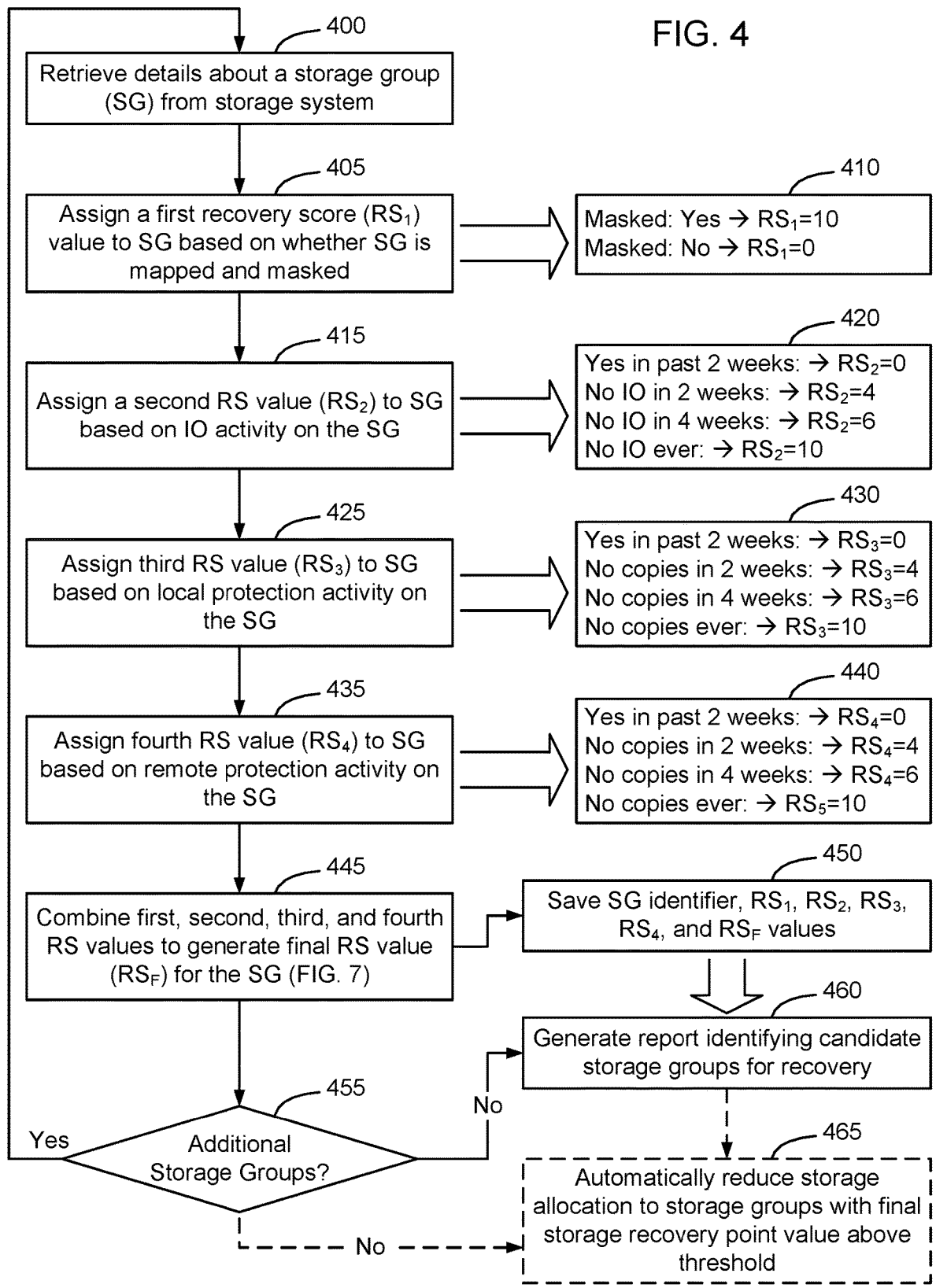
FIGS. 4-6 are flow charts of methods of identifying and recovering unused storage resources on a storage system, according to some embodiments.
Figure 5:
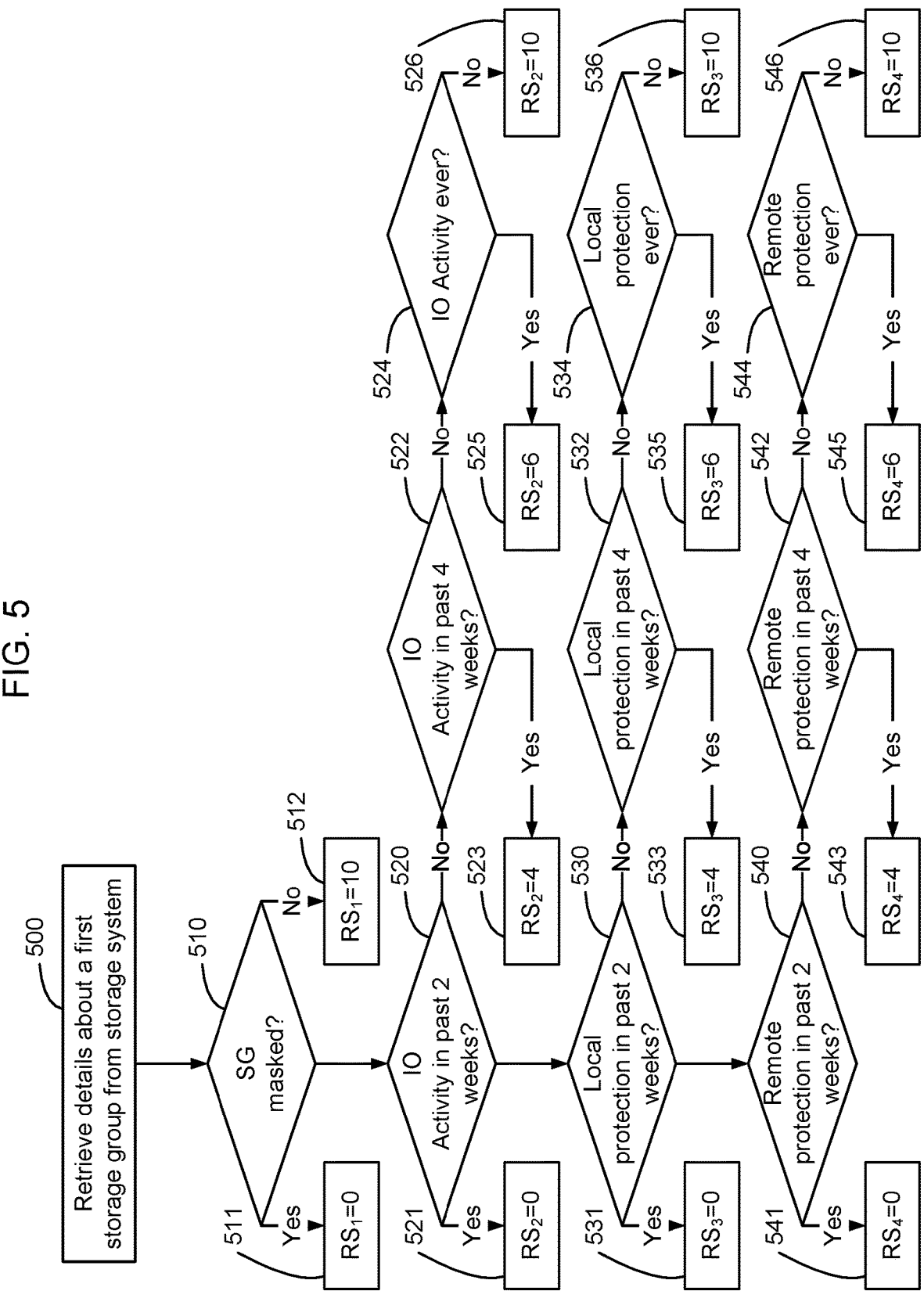
Figure 6:
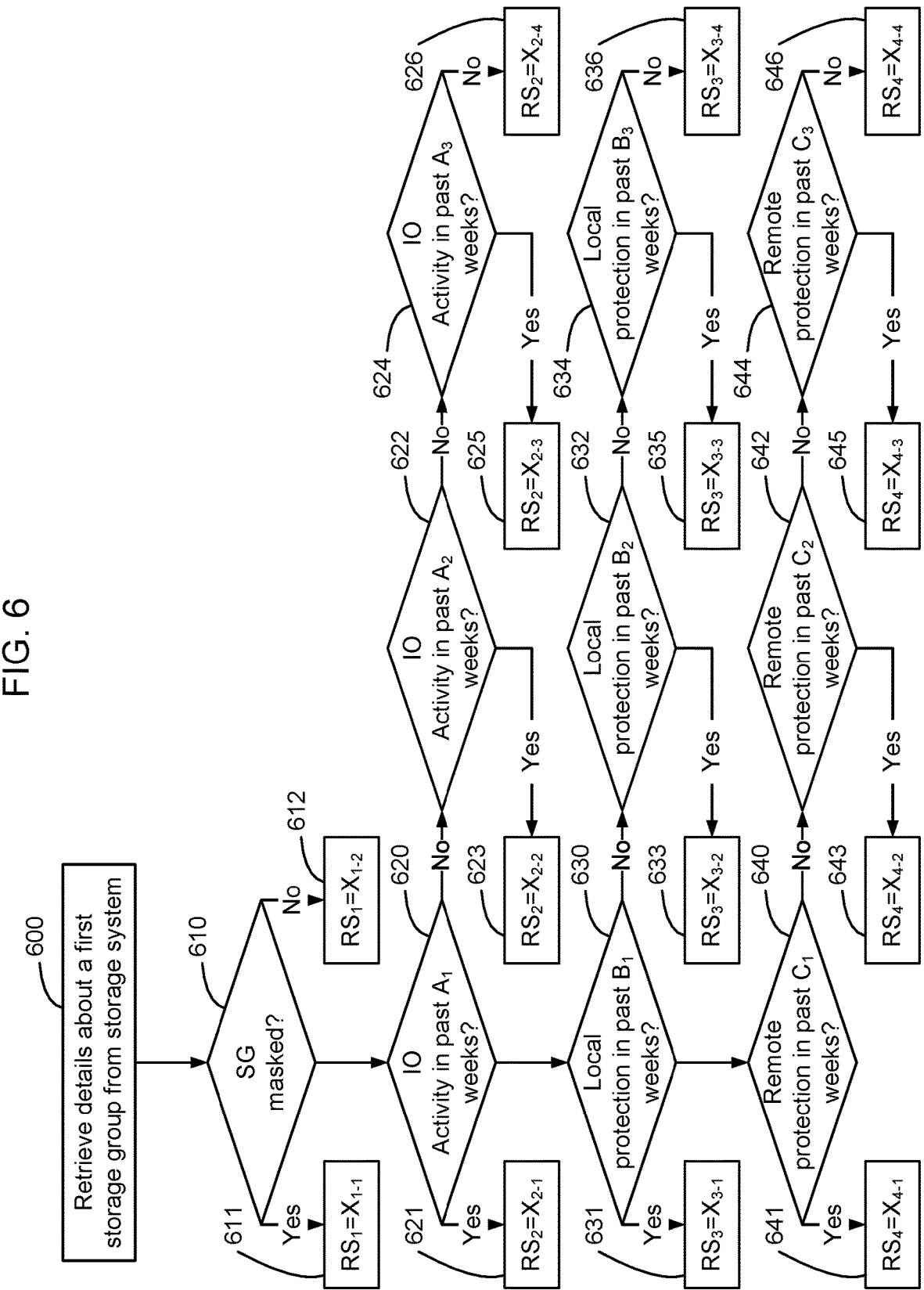

FIGS. 4-6 are flow charts of methods of identifying and recovering unused storage resources on a storage system, according to some embodiments. As shown in FIG. 4, in some embodiments the storage reclamation orchestrator 200 applies a set of storage reclamation rules 205 to the storage group usage attributes, to assign individual and final recovery score values to each of the storage groups 215. Storage groups 215 with a final recovery score value above a recovery threshold are identified as candidates for recovery on the storage system. FIG. 4 shows application of an example set of rules to a set of storage group attributes using a rules engine. FIG. 5 shows application of the same set of rules to the set of storage group attributes using flow logic. FIG. 6 shows application of a set of rules to storage group attributes in which the rules contain user-settable values and the recovery score values assigned to a storage group attribute that falls within one of the rules is also able to be set by the user. Accordingly, although FIG. 4 shows a particular set of rules, and shows assignment of particular recovery score values when a particular storage group attribute falls within the scope of a particular storage reclamation rule 205, it should be understood that FIG. 4 is merely one example and the invention is not limited to an implementation that uses these particular storage reclamation rules 205 or assigns the particular recovery score values shown in FIG. 4.

In the embodiments shown in FIG. 4, when the storage reclamation orchestrator 200 begins execution to identify storage groups 215 that are candidate targets for recovery, the storage reclamation orchestrator 200 retrieves details about a first storage group (SG) from the storage system (block 400). The details about the first storage group, in some embodiments, are obtained by the storage reclamation orchestrator 200 and used to populate the storage usage data structure of FIG. 3, and include the storage group identifiers 300 and storage group usage attributes 305, 310, 315, 320.

The storage reclamation orchestrator 200 assigns a first Recovery Score ($RS_1$) value to the selected storage group 215 based on whether the storage group 215 is currently masked (block 405). In some embodiments the storage reclamation orchestrator 200 assigns a value of 10 to the first recovery score value ($RS_1=10$) if the storage group is not currently masked, and assigns a value of 0 to the first recovery score value ($RS_1=0$) if the storage group is currently masked (block 410). Other values may be assigned to the first recovery score value depending on the implementation, and the values of 0 and 10 are used merely as an example.

The storage reclamation orchestrator 200 assigns a second Recovery Score ($RS_2$) value to the selected storage group 215 based on the amount of time that has elapsed since the most recent IO activity on the storage group (block 415). In some embodiments, the storage reclamation orchestrator 200 assigns a value of 0 to the second recovery score value ($RS_2=0$) if the storage group has had IO activity in the past two weeks. The storage reclamation orchestrator 200 assigns a value of 4 to the second recovery score value ($RS_2=4$) if the storage group has not had IO activity in the past two weeks; assigns a value of 6 to the second recovery score value ($RS_2=6$) if the storage group has not had IO activity in the past four weeks; and assigns a value of IO to the second recovery score value ($RS_2=10$) if the storage group has never had IO activity (block 420). Other values may be assigned to the second recovery score value depending on the implementation, and the values of 0, 4, 6, and 10 are used merely as an example. Likewise, the time thresholds listed in block 420 may be varied depending on the implementation.

The storage reclamation orchestrator 200 assigns a third Recovery Score ($RS_3$) value to the selected storage group 215 based on the amount of time that has elapsed since the most recent local protection activity on the storage group (block 425). In some embodiments, the storage reclamation orchestrator 200 assigns a value of 0 to the third recovery score value ($RS_3=0$) if the storage group has had local protection activity in the past two weeks. The storage reclamation orchestrator 200 assigns a value of 4 to the third recovery score value ($RS_3=4$) if the storage group has not had local protection activity in the past two weeks; assigns a value of 6 to the third recovery score value ($RS_3=6$) if the storage group has not had local protection activity in the past four weeks; and assigns a value of 10 to the third recovery score value ($RS_3=10$) if the storage group has never had local protection activity (block 430). Other values may be assigned to the third recovery score value depending on the implementation, and the values of 0, 4, 6, and 10 are used merely as an example. Likewise, the time thresholds listed in block 430 may be varied depending on the implementation.

The storage reclamation orchestrator 200 assigns a fourth Recovery Score ($RS_4$) value to the selected storage group 215 based on the amount of time that has elapsed since the most recent remote protection activity on the storage group (block 435). In some embodiments, the storage reclamation orchestrator 200 assigns a value of 0 to the fourth recovery score value ($RS_4=0$) if the storage group has had remote protection activity in the past two weeks. The storage reclamation orchestrator 200 assigns a value of 4 to the fourth recovery score value ($RS_4=4$) if the storage group has not had remote protection activity in the past two weeks; assigns a value of 6 to the fourth recovery score value ($RS_4=6$) if the storage group has not had remote protection activity in the past four weeks; and assigns a value of 10 to the fourth recovery score value ($RS_4=10$) if the storage group has never had remote protection activity (block 440). Other values may be assigned to the fourth recovery score value depending on the implementation, and the values of 0, 4, 6, and 10 are used merely as an example. Likewise, the time thresholds listed in block 440 may be varied depending on the implementation.

Although blocks 405/410, 415/420, 425/430, and 435/440 are described in connection with FIG. 4 and are shown in FIG. 4 as being implemented in a particular order, it should be understood that the rules described in connection with these blocks may be applied in any order and, accordingly, blocks 405/410, 415/420, 425/430, and 435/440 may be executed in different orders depending on the implementation. Likewise, different rules may be applied by the storage reclamation orchestrator 200 depending on the implementation. For example, in connection with determining local protection activity on the storage group, the storage reclamation orchestrator 200 may determine whether the local storage volumes (snapshots) created in connection with implementing local protection are all relatively small or empty. If local protection is occurring on the storage group, but the snapshots that are being created are empty, this could indicate that no changes are being made to the data contained in the storage group. Accordingly, other factors may be used to assign recovery score values to the storage group 215, depending on the implementation.

Once the storage reclamation orchestrator 200 has assigned a set of recovery score values to the storage group 215, the storage reclamation orchestrator 200 combines the assigned recovery score values to generate a final recovery score ($RS_F$) for the storage group (block 445). The assigned recovery score values ($RS_1$, $RS_2$, $RS_3$, $RS_4$, and $RS_F$) are then saved (block 450) so that they can subsequently be used to generate a report (block 460). Optionally, the report may be built by the storage reclamation orchestrator 200 incrementally over time, as the storage reclamation orchestrator 200 analyzes each storage group 215.

Once the storage reclamation orchestrator 200 has analyzed the selected storage group, a determination is made as to whether there are additional storage groups to be analyzed (block 455). If there are additional storage groups to be analyzed (a determination of YES at block 455) the storage reclamation orchestrator 200 returns to block 400 to retrieve details about a subsequent storage group to be analyzed. In this manner the storage reclamation orchestrator 200 iterates through and analyzes the usage conditions of each storage group. Although FIG. 4 shows the storage reclamation orchestrator 200 analyzing groups iteratively, in some embodiments the storage reclamation orchestrator 200 may analyze multiple storage groups at once or may analyze all of the storage groups in parallel.

If there are no additional storage groups to be analyzed (a determination of NO at block 455) the storage reclamation orchestrator 200 generates a report (block 460). The report may provide details about all storage groups 215 that were analyzed, or may provide details about only those storage groups that were determined to be candidates for recovery. An example report is show in FIG. 11 and is discussed in greater detail below.

FIGS. 5 and 6 are flow charts showing an example implementation of the rules shown in FIG. 4, in which FIG. 5 applies the same logic based on activity levels and assignment of recovery score values, and FIG. 6 shows an example in which the activity thresholds (number of weeks) and associated recovery score values (RS) values are able to be individually configured.

As shown in FIG. 5, in some embodiments, to analyze a storage group 215 to determine if the storage group is a candidate for recovery, the storage reclamation orchestrator 200 retrieves details about the storage group from the storage system (block 500).

A determination is then made, by the storage reclamation orchestrator 200, whether the storage group 215 is masked (block 510). If the storage group 215 is masked (a determination of YES at block 510), the storage reclamation orchestrator 200 assigns the first recovery score ($RS_1$) a value of 0 (block 511). If the storage group 215 is not masked (a determination of NO at block 510), the storage reclamation orchestrator 200 assigns the first recovery score ($RS_1$) a value of 10 (block 512).

A determination is also made, by the storage reclamation orchestrator 200, whether the storage group 215 has had IO activity in the past two weeks (block 520). If the storage group has had IO activity in the past two weeks (a determination of YES at block 520), the storage reclamation orchestrator 200 assigns the second recovery score ($RS_2$) a value of 0 (block 521). If the storage group 215 has not had IO activity in the past two weeks (a determination of NO at block 520), the storage reclamation orchestrator 200 determines whether the storage group 215 has had IO activity in the past four weeks (block 522). If the storage group 215 has had IO activity in the past four weeks (a determination of YES at block 522), the storage reclamation orchestrator 200 assigns the second recovery score ($RS_2$) a value of 4 (block 523). If the storage group 215 has not had IO activity in the past four weeks (a determination of NO at block 522), the storage reclamation orchestrator 200 determines whether the storage group 215 has had IO activity ever (block 524). If the storage group 215 has had IO activity ever (a determination of YES at block 524), the storage reclamation orchestrator 200 assigns the second recovery score ($RS_2$) a value of 6 (block 525). If the storage group 215 has never had IO activity (a determination of NO at block 524), the storage reclamation orchestrator 200 assigns the second recovery score ($RS_2$) a value of 10 (block 526).

A determination is also made, by the storage reclamation orchestrator 200, whether the storage group 215 has had local protection activity in the past two weeks (block 530). If the storage group 215 has had local protection activity in the past two weeks (a determination of YES at block 530), the storage reclamation orchestrator 200 assigns the third recovery score ($RS_3$) a value of 0 (block 531). If the storage group 215 has not had local protection activity in the past two weeks (a determination of NO at block 530), the storage reclamation orchestrator 200 determines whether the storage group 215 has had local protection activity in the past four weeks (block 532). If the storage group 215 has had local protection activity in the past four weeks (a determination of YES at block 532), the storage reclamation orchestrator 200 assigns the third recovery score ($RS_3$) a value of 4 (block 533). If the storage group 215 has not had local protection activity in the past four weeks (a determination of NO at block 532), the storage reclamation orchestrator 200 determines whether the storage group 215 has had local protection activity ever (block 534). If the storage group 215 has had local protection activity ever (a determination of YES at block 534), the storage reclamation orchestrator 200 assigns the third recovery score ($RS_3$) a value of 6 (block 535). If the storage group 215 has never had local protection activity (a determination of NO at block 534), the storage reclamation orchestrator 200 assigns the third recovery score ($RS_3$) a value of 10 (block 536).

A determination is also made, by the storage reclamation orchestrator 200, whether the storage group 215 has had remote protection activity in the past two weeks (block 540). If the storage group 215 has had remote protection activity in the past two weeks (a determination of YES at block 540), the storage reclamation orchestrator 200 assigns the fourth recovery score ($RS_4$) a value of 0 (block 541). If the storage group 215 has not had remote protection activity in the past two weeks (a determination of NO at block 540), the storage reclamation orchestrator 200 determines whether the storage group 215 has had remote protection activity in the past four weeks (block 542). If the storage group 215 has had remote protection activity in the past four weeks (a determination of YES at block 542), the storage reclamation orchestrator 200 assigns the fourth recovery score ($RS_4$) a value of 4 (block 543). If the storage group 215 has not had remote protection activity in the past four weeks (a determination of NO at block 542), the storage reclamation orchestrator 200 determines whether the storage group 215 has had remote protection activity ever (block 544). If the storage group 215 has had remote protection activity ever (a determination of YES at block 544), the storage reclamation orchestrator 200 assigns the fourth recovery score (RS$_4$) a value of 6 (block 545). If the storage group 215 has never had remote protection activity (a determination of NO at block 544), the storage reclamation orchestrator 200 assigns the fourth recovery score (RS$_4$) a value of 10 (block 536).

FIG. 6 shows an example in which the activity thresholds (number of days, weeks, months, or some other time threshold) and associated recovery score values (RS) values are able to be individually configured, for example using storage system management application 160 (see FIG. 1). As shown in FIG. 6, in some embodiments, to analyze a storage group to determine if the storage group is a candidate for recovery, the storage reclamation orchestrator 200 retrieves details about the storage group 215 from the storage system (block 600).

A determination is then made, by the storage reclamation orchestrator 200, whether the storage group 215 is masked (block 610). If the storage group 215 is masked (a determination of YES at block 610), the storage reclamation orchestrator 200 assigns the first recovery score (RS$_1$) a customer specified value of X$_{1-1}$ points (block 611). If the storage group 215 is not masked (a determination of NO at block 610), the storage reclamation orchestrator 200 assigns the first recovery score (RS$_1$) a customer specified value of X$_{1-2}$ points (block 612).

A determination is also made, by the storage reclamation orchestrator 200, whether the storage group 215 has had IO activity in the past customer specified A$_1$ weeks (block 620). If the storage group 215 has had IO activity in the past customer specified A$_1$ weeks (a determination of YES at block 620), the storage reclamation orchestrator 200 assigns the second recovery score (RS$_2$) a customer specified value of X$_{2-1}$ points (block 621). If the storage group 215 has not had IO activity in the past customer specified A$_1$ weeks (a determination of NO at block 620), the storage reclamation orchestrator 200 determines whether the storage group 215 has had IO activity in the past customer specified A$_2$ weeks (block 622). If the storage group 215 has had IO activity in the past customer specified A$_2$ weeks (a determination of YES at block 622), the storage reclamation orchestrator 200 assigns the second recovery score (RS$_2$) a customer specified value of X$_{2-2}$ points (block 623). If the storage group 215 has not had IO activity in the past customer specified A$_2$ weeks (a determination of NO at block 622), the storage reclamation orchestrator 200 determines whether the storage group 215 has had IO activity in the past customer specified A$_3$ weeks (block 624). If the storage group 215 has had IO activity in the past customer specified A$_3$ weeks (a determination of YES at block 624), the storage reclamation orchestrator 200 assigns the second recovery score (RS$_2$) a customer specified value of X$_{2-3}$ points (block 625). If the storage group 215 has not had IO activity in the past customer specified A$_3$ weeks (a determination of NO at block 624), the storage reclamation orchestrator 200 assigns the second recovery score (RS$_2$) a customer specified value of X$_{2-4}$ points (block 626).

A determination is also made, by the storage reclamation orchestrator 200, whether the storage group 215 has had local protection activity in the past customer specified B$_1$ weeks (block 630). If the storage group 215 has had local protection activity in the past customer specified B$_1$ weeks (a determination of YES at block 630), the storage reclamation orchestrator 200 assigns the third recovery score (RS$_3$) a customer specified value of X$_{3-1}$ points (block 631). If the storage group 215 has not had local protection activity in the past customer specified B$_1$ weeks (a determination of NO at block 630), the storage reclamation orchestrator 200 determines whether the storage group 215 has had local protection activity in the past customer specified B$_2$ weeks (block 632). If the storage group 215 has had local protection activity in the past customer specified B$_2$ weeks (a determination of YES at block 632), the storage reclamation orchestrator 200 assigns the third recovery score (RS$_3$) a customer specified value of X$_{3-2}$ points (block 633). If the storage group 215 has not had local protection activity in the past customer specified B$_2$ weeks (a determination of NO at block 632), the storage reclamation orchestrator 200 determines whether the storage group 215 has had local protection activity in the past customer specified B$_3$ weeks (block 634). If the storage group 215 has had local protection activity in the past customer specified B$_3$ weeks (a determination of YES at block 634), the storage reclamation orchestrator 200 assigns the third recovery score (RS$_3$) a customer specified value of X$_{3-3}$ points (block 635). If the storage group 215 has not had local protection activity in the past customer specified B$_3$ weeks (a determination of NO at block 634), the storage reclamation orchestrator 200 assigns the third recovery score (RS$_3$) a customer specified value of X$_{3-4}$ points (block 636).

A determination is also made, by the storage reclamation orchestrator 200, whether the storage group 215 has had remote protection activity in the past customer specified C$_1$ weeks (block 640). If the storage group 215 has had remote protection activity in the past customer specified C$_1$ weeks (a determination of YES at block 640), the storage reclamation orchestrator 200 assigns the fourth recovery score (RS$_4$) a customer specified value of X$_{4-1}$ points (block 641). If the storage group 215 has not had remote protection activity in the past customer specified C$_1$ weeks (a determination of NO at block 640), the storage reclamation orchestrator 200 determines whether the storage group 215 has had remote protection activity in the past customer specified C$_2$ weeks (block 642). If the storage group 215 has had remote protection activity in the past customer specified C$_2$ weeks (a determination of YES at block 642), the storage reclamation orchestrator 200 assigns the fourth recovery score (RS$_4$) a customer specified value of X$_{4-2}$ points (block 643). If the storage group 215 has not had remote protection activity in the past customer specified C$_2$ weeks (a determination of NO at block 642), the storage reclamation orchestrator 200 determines whether the storage group 215 has had remote protection activity in the past customer specified C$_3$ weeks (block 644). If the storage group 215 has had remote protection activity in the past customer specified C$_3$ weeks (a determination of YES at block 644), the storage reclamation orchestrator 200 assigns the fourth recovery score (RS$_4$) a customer specified value of X$_{4-4}$ points (block 645). If the storage group 215 has not had remote protection activity in the past customer specified C$_3$ weeks (a determination of NO at block 644), the storage reclamation orchestrator 200 assigns the fourth recovery score (RS$_4$) a customer specified value of X$_{4-4}$ points (block 636).

Figure 7:
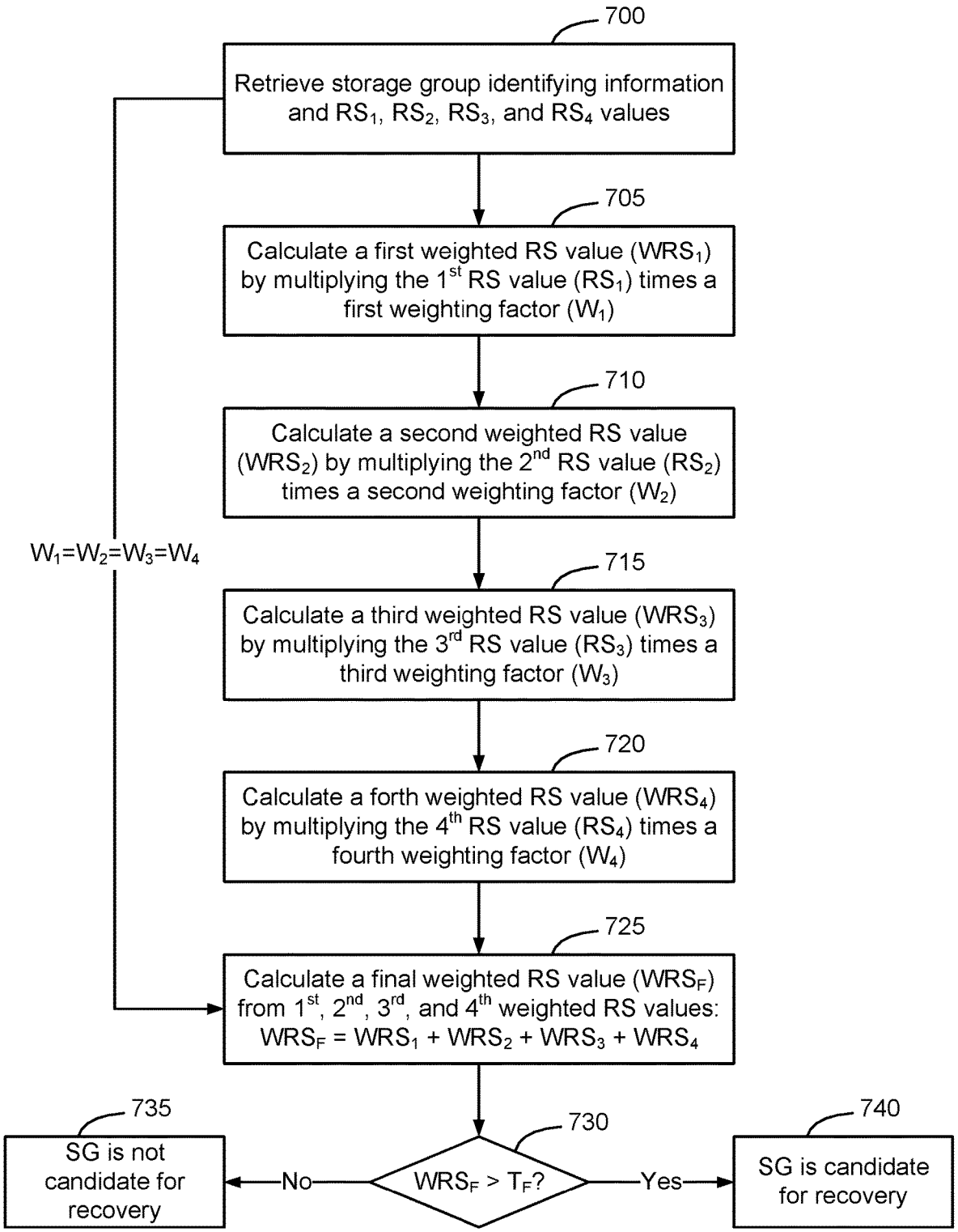
FIG. 7 is a flow chart of an example method of combining storage recovery score values to generate a final storage recovery score value for a storage group, according to some embodiments.

FIG. 7 is a flow chart of an example method of combining storage recovery score values to generate a final storage recovery score value for a storage group, according to some embodiments.

There are multiple ways of combining the storage recovery score values to generate a final storage recovery score value for a storage group. In some embodiments, the $1^{st}$, $2^{nd}$, $3^{rd}$, and $4^{th}$, RS values are added together to create the final RS score $RS_F$. In other embodiments, the $1^{st}$, $2^{nd}$, $3^{rd}$, and $4^{th}$, RS values may be weighted and then used to create the final RS score $RS_F$. Directly adding the $1^{st}$, $2^{nd}$, $3^{rd}$, and $4^{th}$, RS values may be considered a special case where the weighting factors of each of the $1^{st}$, $2^{nd}$, $3^{rd}$, and $4^{th}$, RS values are the same.

If the weighting factors of each of the $1^{st}$, $2^{nd}$, $3^{rd}$, and $4^{th}$, RS values are not the same, in some embodiments, the storage reclamation orchestrator 200 retrieves the storage group identifying information and the $RS_1$, $RS_2$, $RS_3$, and $RS_4$ values (block 700). The storage reclamation orchestrator 200 calculates a first weighted RS value ($WRS_1$) by multiplying the first RS value ($RS_1$) with a first weighting factor ($W_1$) (block 705). The storage reclamation orchestrator 200 calculates a second weighted RS value ($WRS_2$) by multiplying the second RS value ($RS_2$) with a second weighting factor ($W_2$) (block 710). The storage reclamation orchestrator 200 calculates a third weighted RS value ($WRS_3$) by multiplying the third RS value ($RS_3$) with a third weighting factor ($W_3$) (block 715). The storage reclamation orchestrator 200 calculates a fourth weighted RS value ($WRS_4$) by multiplying the fourth RS value ($RS_4$) with a fourth weighting factor ($W_4$) (block 720).

The storage reclamation orchestrator 200 calculates a final weighted RS value ($WRS_F$) from the $1^{st}$, $2^{nd}$, $3^{rd}$, and $4^{th}$, weighted RS values: $WRS_F = WRS_1 + WRS_2 + WRS_3 + WRS_4$ (block 725). As noted above, in the situation where W1=W2=W3=W4 the final RS value $RS_F$ may be calculated as $RS_F = RS_1 + RS_2 + RS_3 + RS_4$.

The final RS value ($RS_F$ or $WRS_F$) is then compared with a storage recovery threshold $T_F$ to enable the storage reclamation orchestrator 200 to make a determination as to whether the storage group is a candidate for recovery (block 730). If the final RS value ($RS_F$ or $WRS_F$) is higher than the storage recovery threshold $T_F$ (a determination of YES at block 730) the storage group is a candidate for recovery (block 735). If the final RS value ($RS_F$ or $WRS_F$) is equal to or lower than the storage recovery threshold $T_F$ (a determination of NO at block 730) the storage group is not a candidate for recovery (block 740). In the example described above in connection with FIGS. 4 and 5, an example storage recovery threshold $T_F$ value may be 25 or 30 points, although other example threshold values may be used as well. Where the customer sets the various values, as described in connection with FIG. 6, the storage recovery threshold $T_F$ value would also be a customer-specified value. Likewise, the weighting factors $W_1$, $W_2$, $W_3$, and $W_4$ may be customer-specified values, depending on the implementation.

Figure 8:
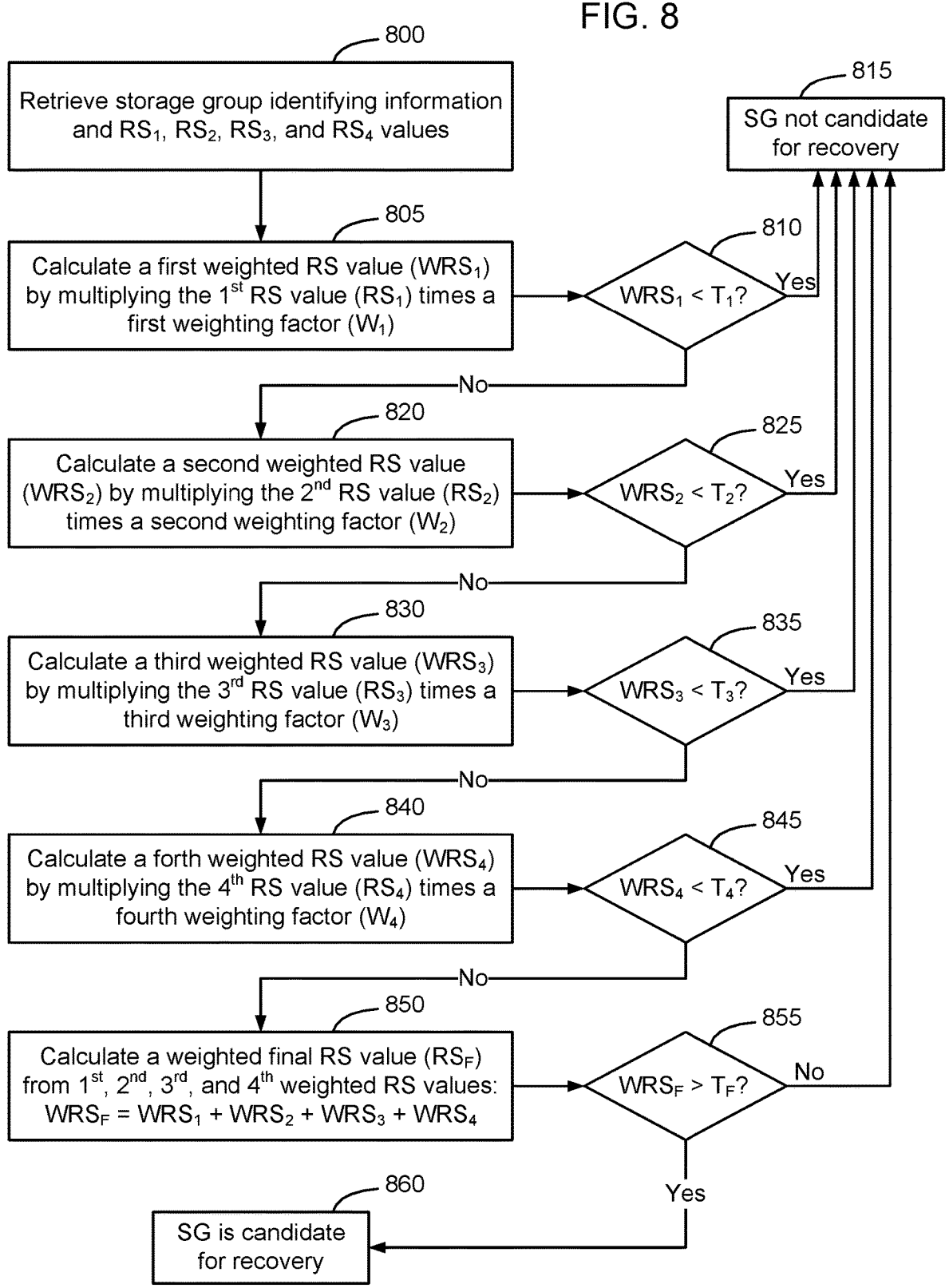
FIG. 8 is a flow chart of an example method of applying thresholds to individual storage recovery score values while generating a final storage recovery score for a storage group, according to some embodiments.

FIG. 8 is a flow chart of an example method of applying thresholds to individual storage recovery score values while generating a final storage recovery score for a storage group, according to some embodiments. Depending on the implementation, it may be preferable to not identify a storage group as a candidate for recovery, if one or more of the RS values indicates that it is likely that the storage group is currently being used. For example, if the storage group is masked and has current 10 activity, but doesn't have any recent local or remote protection activity, the storage group may have a final recovery score value that would cause the storage group to be identified as a candidate for recovery by the storage reclamation orchestrator 200 (depending on the threshold $T_F$), although at least two factors make it clear that the storage group is currently being used and should not be recovered.

Accordingly, as shown in FIG. 8, in some embodiments, rather than only applying a single threshold $T_F$ and comparing the final RS value ($RS_F$) with that final threshold $T_F$, each of the RS values is similarly compared with individual thresholds. Based on the individual comparisons, each of the individual RS values may prevent a storage group from being identified as a candidate storage group for recovery.

In some embodiments, the storage reclamation orchestrator 200 retrieves the storage group identifying information and the $RS_1$, $RS_2$, $RS_3$, and $RS_4$ values (block 800). The storage reclamation orchestrator 200 calculates a first weighted RS value ($WRS_1$) by multiplying the first RS value ($RS_1$) with a first weighting factor ($W_1$) (block 805). If the first weighting factor is equal to 1, the first weighted RS value ($WRS_1$) will equal the first RS value ($RS_1$). The first weighted RS value ($WRS_1$) is then compared against a first threshold $T_1$ (block 810). If the first weighted RS value ($WRS_1$) is less than the first threshold $T_1$ (a determination of YES at block 810), the storage group is not a candidate for recovery (block 815).

The storage reclamation orchestrator 200 calculates a second weighted RS value ($WRS_2$) by multiplying the second RS value ($RS_2$) with a second weighting factor ($W_2$) (block 820). If the second weighting factor is equal to 1, the second weighted RS value ($WRS_2$) will equal the second RS value ($RS_2$). The second weighted RS value ($WRS_2$) is then compared against a second threshold $T_2$ (block 825). If the second weighted RS value ($WRS_2$) is less than the second threshold $T_2$ (a determination of YES at block 820), the storage group is not a candidate for recovery (block 815).

The storage reclamation orchestrator 200 calculates a third weighted RS value ($WRS_3$) by multiplying the third RS value ($RS_3$) with a third weighting factor ($W_3$) (block 830). If the third weighting factor is equal to 1, the third weighted RS value ($WRS_3$) will equal the third RS value ($RS_3$). The third weighted RS value ($WRS_3$) is then compared against a third threshold $T_3$ (block 835). If the third weighted RS value ($WRS_3$) is less than the third threshold $T_3$ (a determination of YES at block 820), the storage group is not a candidate for recovery (block 815).

The storage reclamation orchestrator 200 calculates a fourth weighted RS value ($WRS_4$) by multiplying the second RS value ($RS_4$) with a fourth weighting factor ($W_4$) (block 840). If the fourth weighting factor is equal to 1, the fourth weighted RS value ($WRS_4$) will equal the fourth RS value ($RS_4$). The fourth weighted RS value ($WRS_2$) is then compared against a fourth threshold $T_4$ (block 845). If the fourth weighted RS value ($WRS_4$) is less than the fourth threshold $T_4$ (a determination of YES at block 840), the storage group is not a candidate for recovery (block 815).

The storage reclamation orchestrator 200 calculates a final weighted RS value ($WRS_F$) from the $1^{st}$, $2^{nd}$, $3^{rd}$, and $4^{th}$, weighted RS values: $WRS_F = WRS_1 + WRS_2 + WRS_3 + WRS_4$ (block 85). As noted above, in the situation where $W_1 = W_2 = W_3 = W_4$ the final RS value $RS_F$ may be calculated as $RS_F = RS_1 + RS_2 + RS_3 + RS_4$.

The final RS value ($RS_F$ or $WRS_F$) is then compared with a storage recovery threshold $T_F$ to (block 855). If the final RS value ($RS_F$ or $WRS_F$) is equal to or greater than the storage recovery threshold $T_F$ (a determination of YES at block 855) the storage group is a candidate for recovery (block 860). If the final RS value ($RS_F$ or $WRS_F$) is lower than the storage recovery threshold $T_F$ (a determination of NO at block 855) the storage group is not a candidate for recovery (block 860). In some embodiments, the thresholds $T_1$, $T_2$, $T_3$, $T_4$, and $T_F$ are customer customer-specified values.

Figure 9:
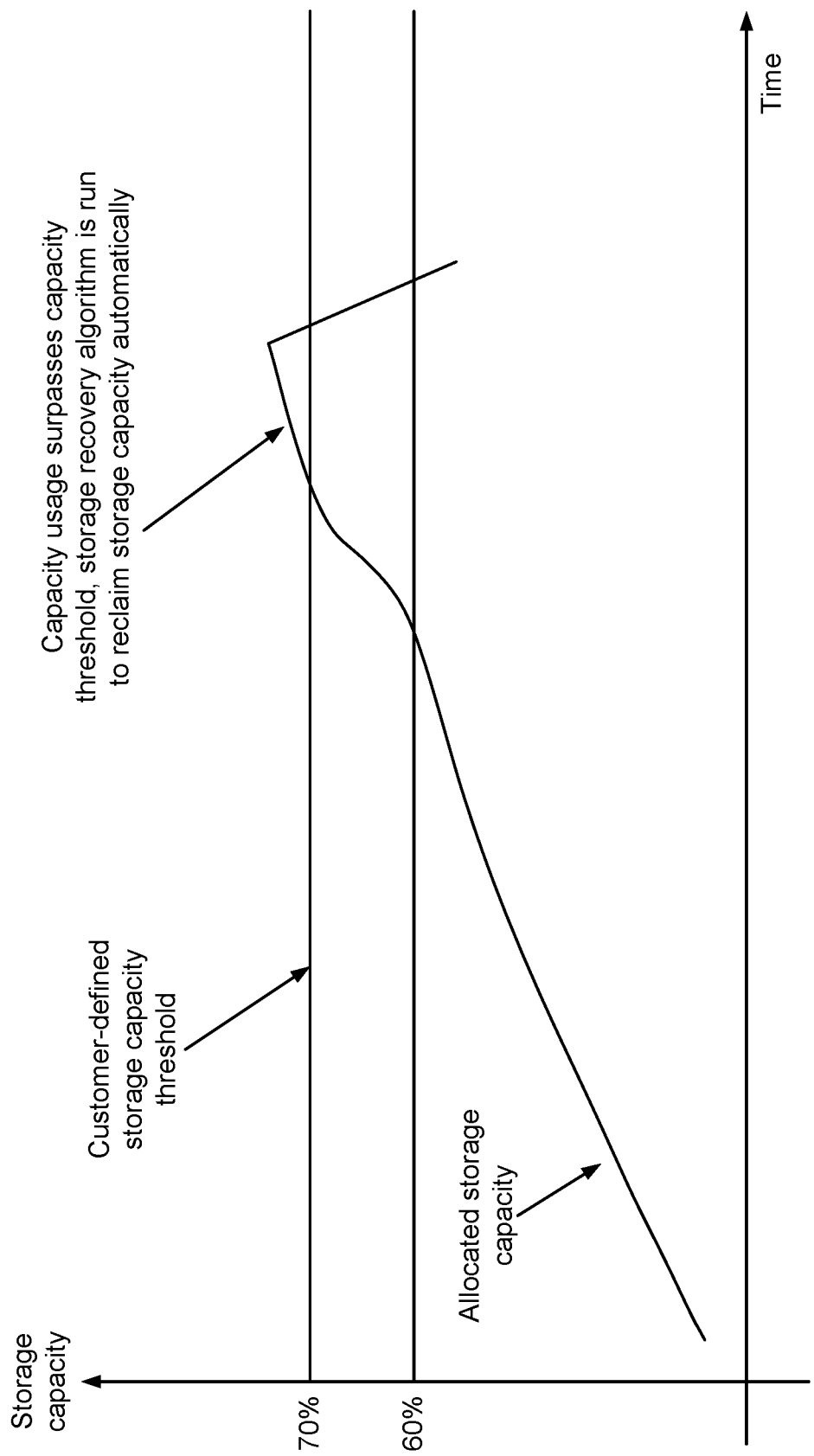
FIG. 9 is a graph of storage capacity vs time, showing a hypothetical storage capacity variation over time and automatic initiation of a process of identifying and recovering unused storage resources on the storage system, according to some embodiments.

FIG. 9 is a graph of storage capacity vs time, showing a hypothetical storage capacity variation over time and automatic initiation of a process of identifying and recovering unused storage resources on the storage system, according to some embodiments. As shown in FIG. 9, the amount of allocated storage capacity on a storage system 100 may increase over time. Various thresholds may be set, such as a 60% or 70% capacity threshold and, when the allocated storage capacity crosses the customer-defined storage capacity threshold, the storage reclamation orchestrator 200 may be initiated to analyze storage groups to determine candidate storage groups for recovery. By running using the storage reclamation orchestrator 200 to run a storage recovery algorithm automatically, when the storage capacity threshold is breached, it is possible to identify storage groups that may be reclaimed to facilitate management of the storage resources of the storage system. Additionally, in some embodiments, the storage reclamation orchestrator 200 can automatically recover storage capacity associated with storage groups.

Figure 10:
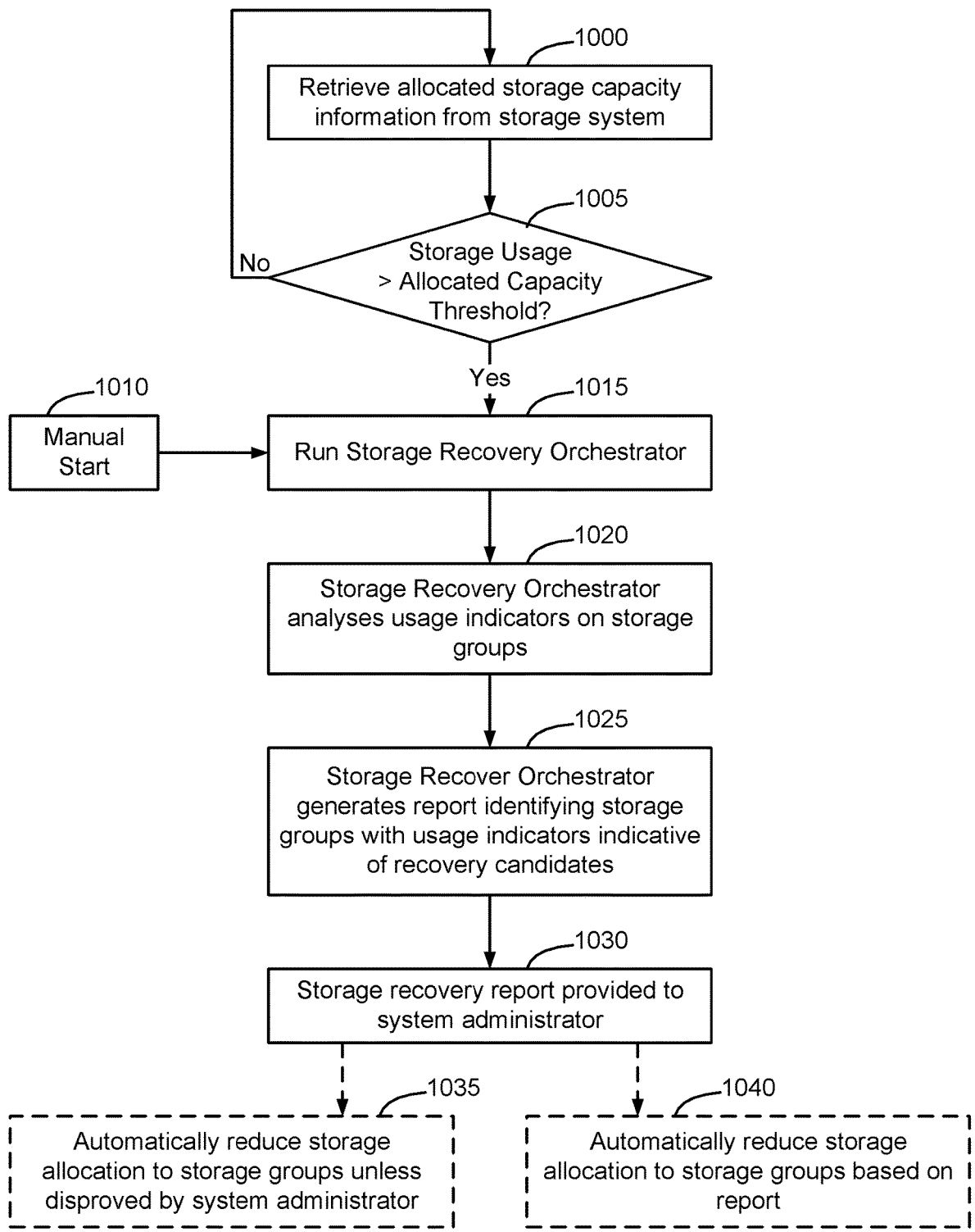
FIG. 10 is a flow chart of an example method of initiating a process of identifying and recovering unused storage resources on a storage system based on storage capacity usage, according to some embodiments.

FIG. 10 is a flow chart of an example method of initiating a process of identifying and recovering unused storage resources on a storage system based on storage capacity usage, according to some embodiments. As shown in FIG. 10, in some embodiments, the storage reclamation orchestrator 200 periodically retrieves information identifying an amount of allocated storage capacity on the storage system 100 (block 1000). The storage reclamation orchestrator 200 compares the storage usage with an allocated storage capacity threshold (block 1005). If the amount of allocated storage capacity is not above the customer-defined allocated storage capacity threshold (a determination of NO at block 1005) the process waits for a period of time. For example, the storage reclamation orchestrator 200 may be configured to run daily, weekly, or on demand.

If the amount of allocated storage capacity is above the customer-defined allocated storage capacity threshold (a determination of YES at block 1005), or if initiated manually by a customer (block 1010) the storage reclamation orchestrator 200 will execute to analyze storage usage information of storage groups on the storage system (block 1015). In particular, the storage recovery orchestrator 200 will analyze usage indicators on the storage groups (block 1020). As part of this process, the storage reclamation orchestrator 200 generates a report identifying storage groups with usage indicators indicative of recovery candidates (block 1025). The storage report will be provided to a system administrator (block 1030) to enable the storage administrator to determine which storage groups are currently not being used and are candidates for recovery.

Optionally, the storage reclamation orchestrator 200 may automatically reduce the storage allocation to storage groups unless disproved by the system administrator (block 1035). Alternatively, the storage reclamation orchestrator 200 may automatically reduce the storage allocation to storage groups based on the report (block 1040). Blocks 1035 and 1040 are shown in dashed lines because these steps are optional. Some system administrators may wish to enable block 1035 or block 1040, whereas other system administrators may prefer to not enable the storage reclamation orchestrator 200 to take action to recover storage allocations from storage groups.

FIG. 11 is a functional block diagram of an example storage recovery report generated by the storage reclamation orchestrator 200, according to some embodiments. The values in FIG. 11 correspond to the values shown in FIG. 3, after applying the rules shown in FIG. 4. As shown in FIG. 11, in some embodiments the storage recovery report has entries identified by storage group identifier, and showing each of the recovery scores $RS_1$, $RS_2$, $RS_3$, $RS_4$, that were generated by the storage reclamation orchestrator 200. The total recovery score $RS_F$ is also shown. By including the individual recovery scores $RS_1$, $RS_2$, $RS_3$, $RS_4$, as well as the final recovery score $RS_F$, the report provides the system administrator insight as to why a particular storage group has been identified b the storage reclamation orchestrator 200 as a candidate for recovery.

In some embodiments, the report also contains information identifying an amount of storage resources associated with the storage group. The amount of storage resources associated with the storage group includes both the storage resources used to implement the storage group, as well as other storage resources used to implement snapshot copies of data contained in the storage group, for example that were generated in connection with local protection activity. By providing an indication of the amount of storage that may be reclaimed, the administrator can prioritize a storage group for investigation and ultimately for recovery, if the storage group is being used on the storage system 100.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for identifying and recovering unused storage resources on a storage system, the computer program including a set of instructions which, when executed by a computer, cause the computer to perform a method comprising the steps of: obtaining storage group usage attributes for a storage group, the storage group usage attributes identifying whether the storage group is masked, input/output (IO) information on the storage group, local protection information associated with the storage group, and remote protection information associated with the storage group; using a first rule to assign a first recovery score to the storage group based on whether the storage group is masked; using a second rule to assign a second recovery score to the storage group based on the IO information on the storage group; using a third rule to assign a third recovery score to the storage group based on the local protection information associated with the storage group; using a fourth rule to assign a fourth recovery score to the storage group based on the remote protection information associated with the storage group; combining the first recovery score, second recovery score, third recovery score, and fourth recovery score, to assign a final recovery score to the storage group; comparing the final recovery score assigned to the storage group with a threshold; and based on the comparison between the final recovery score assigned to the storage group and the threshold, selectively identifying the storage group as a potential storage group for recovery of unused storage resources.

2. The non-transitory tangible computer readable storage medium of claim 1, wherein using the first rule causes a first value to be assigned to the first recovery score if the storage group is currently masked, and causes a second value to be assigned to the first recovery score if the storage group is not currently masked.

3. The non-transitory tangible computer readable storage medium of claim 2, wherein the second value is larger than the first value.

4. The non-transitory tangible computer readable storage medium of claim 1, wherein using the second rule causes:
a first value to be assigned to the second recovery score if the IO information on the storage group indicates that IO activity has occurred on the storage group within a previous first number of weeks;
a second value to be assigned to the second recovery score if the IO information on the storage group indicates that IO activity has occurred on the storage group within a previous second number of weeks; and
a third value to be assigned to the second recovery score if the IO information on the storage group indicates that IO activity has occurred on the storage group within a previous third number of weeks.

5. The non-transitory tangible computer readable storage medium of claim 4, wherein the second number of weeks is larger than the first number of weeks, and wherein the third number of weeks is larger than the second number of weeks.

6. The non-transitory tangible computer readable storage medium of claim 5, wherein the second value is larger than the first value, and wherein the third value is larger than the second value.

7. The non-transitory tangible computer readable storage medium of claim 1, wherein using the third rule causes:
a first value to be assigned to the third recovery score if the local protection information associated with the storage group indicates that local protection activity has occurred on the storage group within a previous first number of weeks;
a second value to be assigned to the third recovery score if the local protection information associated with the storage group indicates that local protection activity has occurred on the storage group within a previous second number of weeks; and
a third value to be assigned to the third recovery score if the local protection information associated with the storage group indicates that local protection activity has occurred on the storage group within a previous third number of weeks.

8. The non-transitory tangible computer readable storage medium of claim 7, wherein the second number of weeks is larger than the first number of weeks, and wherein the third number of weeks is larger than the second number of weeks.

9. The non-transitory tangible computer readable storage medium of claim 8, wherein the second value is larger than the first value, and wherein the third value is larger than the second value.

10. The non-transitory tangible computer readable storage medium of claim 7, wherein local protection activity comprises creation of a local point-in-time snapshot copy of the storage group.

11. The non-transitory tangible computer readable storage medium of claim 1, wherein using the third rule causes:
a first value to be assigned to the fourth recovery score if the remote protection information associated with the storage group indicates that remote protection activity has occurred on the storage group within a previous first number of weeks;
a second value to be assigned to the fourth recovery score if the remote protection information associated with the storage group indicates that remote protection activity has occurred on the storage group within a previous second number of weeks; and
a third value to be assigned to the fourth recovery score if the remote protection information associated with the storage group indicates that remote protection activity has occurred on the storage group within a previous third number of weeks.

12. The non-transitory tangible computer readable storage medium of claim 11, wherein the second number of weeks is larger than the first number of weeks, and wherein the third number of weeks is larger than the second number of weeks.

13. The non-transitory tangible computer readable storage medium of claim 12, wherein the second value is larger than the first value, and wherein the third value is larger than the second value.

14. The non-transitory tangible computer readable storage medium of claim 11, wherein remote protection activity comprises mirroring the storage group to a remote storage location.

15. The non-transitory tangible computer readable storage medium of claim 1, wherein combining the first recovery score, second recovery score, third recovery score, and fourth recovery score to assign the final recovery score to the storage group comprises adding the first recovery score, second recovery score, third recovery score, and fourth recovery score.

16. The non-transitory tangible computer readable storage medium of claim 1, wherein combining the first recovery score, second recovery score, third recovery score, and fourth recovery score to assign the final recovery score to the storage group comprises: applying a first weighting function to the first recovery score to create a weighted second recovery score; applying a second weighting function to the second recovery score to create a weighted second recovery score; applying a third weighting function to the third recovery score to create a weighted third recovery score; applying a fourth weighting function to the fourth recovery score to create a weighted fourth recovery score; and adding the weighted first recovery score, weighted second recovery score, weighted third recovery score, and weighted fourth recovery score.

17. The non-transitory tangible computer readable storage medium of claim 1, further comprising generating a report with the selectively identified storage group, the report containing identifying information of the storage group, the first recovery score, second recovery score, third recovery score, fourth recovery score, and final recovery score.

18. The non-transitory tangible computer readable storage medium of claim 17, wherein the report further comprises information identifying an amount of storage resources associated with the storage group.

19. The non-transitory tangible computer readable storage medium of claim 18, wherein the amount of storage resources associated with the storage group includes first storage resources used to implement the storage group and second storage resources used to implement snapshot copies of data contained in the storage group.

20. The non-transitory tangible computer readable storage medium of claim 1, wherein selectively identifying the storage group as the potential storage group for recovery of unused storage resources further comprises automatically recovering storage resources associated with the storage group.

* * * * *